United States Patent
Co et al.

(10) Patent No.: US 11,042,933 B1
(45) Date of Patent: Jun. 22, 2021

(54) SYSTEM FOR PROCESSING WITHHOLDING PAYMENTS

(71) Applicant: Chicago Mercantile Exchange Inc., Chicago, IL (US)

(72) Inventors: Richard Co, Chicago, IL (US); Timothy Francis McCourt, New York, NY (US); Thomas Patrick Rafferty, Chicago, IL (US); John Balaam Alexander Kerpel, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 151 days.

(21) Appl. No.: 15/786,260

(22) Filed: Oct. 17, 2017

(51) Int. Cl.
*G06Q 40/04* (2012.01)
*G06Q 20/02* (2012.01)
*G06Q 40/06* (2012.01)

(52) U.S. Cl.
CPC .......... *G06Q 40/04* (2013.01); *G06Q 20/023* (2013.01); *G06Q 40/06* (2013.01)

(58) Field of Classification Search
CPC ....... G06Q 40/04; G06Q 20/023; G06Q 40/06
USPC ......................................................... 705/37
See application file for complete search history.

(56) References Cited

U.S. PATENT DOCUMENTS

| | | |
|---|---|---|
| 5,297,031 A | 3/1994 | Gutterman et al. |
| 5,915,245 A | 6/1999 | Patterson, Jr. et al. |
| 6,161,099 A | 12/2000 | Harrington et al. |
| 6,321,212 B1 | 11/2001 | Lange |
| 6,345,090 B1 | 2/2002 | Walker et al. |
| 6,421,653 B1 | 7/2002 | May |
| 6,493,683 B1 | 12/2002 | David et al. |
| H002064 H | 5/2003 | Buchalter |
| 6,629,081 B1 | 9/2003 | Cornelius et al. |
| 6,659,861 B1 | 12/2003 | Faris et al. |
| 6,732,161 B1 | 5/2004 | Hess et al. |
| 6,768,981 B2 | 7/2004 | Patterson, Jr. et al. |
| 6,892,186 B1 | 5/2005 | Preist |
| 6,952,682 B1 | 10/2005 | Wellman |
| 7,007,076 B1 | 2/2006 | Hess et al. |
| 7,376,614 B1 | 5/2008 | Scheinberg et al. |
| 8,626,638 B2 * | 1/2014 | Co ................. G06Q 40/04 705/37 |
| 9,311,675 B2 | 4/2016 | Labuszewski |
| 9,317,884 B2 | 4/2016 | Labuszewski |

(Continued)

OTHER PUBLICATIONS

"Investopedia, Long/Short Equity, Apr. 16, 2016, investopedia.com" (Year: 2016).*

(Continued)

*Primary Examiner* — Bruce I Ebersman
(74) *Attorney, Agent, or Firm* — Lempia Summerfield Katz LLC

(57) ABSTRACT

Systems and methods are provided for efficiently processing withholding payments for constructive dividends. A party that receives constructive dividend payments also has a corresponding short position in a withholding financial instrument. A clearing house computer system adjusts the value of a withholding financial instrument in response to receipt of constructive dividend payments. The clearing house computer system determines a variation margin amount for the short party and processes a variation margin payment from the short party to a withholding account through the variation margin settlement system.

19 Claims, 3 Drawing Sheets

(56) References Cited

U.S. PATENT DOCUMENTS

| | | | |
|---|---|---|---|
| 9,317,885 B2 | 4/2016 | Labuszewski | |
| 9,317,886 B2 | 4/2016 | Labuszewski | |
| 9,460,468 B2 | 10/2016 | Boberski | |
| 10,192,268 B2* | 1/2019 | Booth | G06Q 40/04 |
| 2001/0027437 A1* | 10/2001 | Turbeville | G06Q 20/102 |
| | | | 705/38 |
| 2004/0024692 A1* | 2/2004 | Turbeville | G06Q 40/08 |
| | | | 705/38 |
| 2005/0131789 A1* | 6/2005 | Mintz | G06Q 40/08 |
| | | | 705/35 |
| 2005/0216387 A1 | 9/2005 | Barany et al. | |
| 2006/0224491 A1* | 10/2006 | Pinkava | G06Q 40/02 |
| | | | 705/37 |
| 2007/0118453 A1 | 5/2007 | Bauerschmidt et al. | |
| 2007/0239589 A1 | 10/2007 | Wilson, Jr. et al. | |
| 2008/0114702 A1 | 5/2008 | Hawrysz | |
| 2008/0120144 A1 | 5/2008 | Bartell et al. | |
| 2009/0177571 A1 | 7/2009 | Gogol et al. | |
| 2009/0182658 A1* | 7/2009 | Lutnick | G06Q 40/04 |
| | | | 705/37 |
| 2009/0313162 A1 | 12/2009 | Flory et al. | |
| 2010/0094744 A1 | 4/2010 | Van Slyke et al. | |
| 2011/0022539 A1 | 1/2011 | Joenk | |
| 2011/0087621 A1* | 4/2011 | Broms | G06Q 40/06 |
| | | | 705/36 R |
| 2012/0078772 A1* | 3/2012 | Booth | G06Q 40/04 |
| | | | 705/37 |
| 2012/0197776 A1* | 8/2012 | Studnitzer | G06Q 40/04 |
| | | | 705/37 |
| 2012/0323764 A1 | 12/2012 | Boberski et al. | |
| 2015/0106252 A1 | 4/2015 | Labuszewski et al. | |
| 2015/0106255 A1 | 4/2015 | Labuszewski et al. | |
| 2015/0112845 A1 | 4/2015 | Labuszewski et al. | |
| 2015/0379642 A1 | 12/2015 | Tagliani et al. | |
| 2016/0203458 A1 | 7/2016 | Boberski | |
| 2016/0203459 A1 | 7/2016 | Labuszewski | |
| 2016/0203460 A1 | 7/2016 | Labuszewski | |
| 2016/0203461 A1 | 7/2016 | Labuszewski | |
| 2016/0203555 A1 | 7/2016 | Labuszewski | |
| 2016/0335629 A1* | 11/2016 | Scott | G06Q 40/06 |
| 2017/0004592 A1 | 1/2017 | Co | |
| 2019/0114334 A1* | 4/2019 | Gunther | G06F 16/2358 |

OTHER PUBLICATIONS

"Investopedia, Constructive Dividends, Sep. 23, 2017, investopedia. com" (Year: 2017).*

"Dividend Swaps and Dividend Futures, State of Play" Scott Mixen (Year: 2014).*

David Boberski, "Zero Coupon Interest Rate Swap Futures Overview", CME Group, Jun. 2009, 2 pages.

International Preliminary Report on Patentability in PCT/US2012/039246, dated Dec. 17, 2013, 12 pages.

International Search Report and Written Opinion in PCT/US2012/039246, dated Aug. 3, 2012, 13 pages.

* cited by examiner

SYSTEM FOR PROCESSING WITHHOLDING PAYMENTS

FIELD OF THE INVENTION

The present invention relates to the processing of constructive dividend payments, in particular, to methods and systems for processing withholding payments for constructive dividend payments.

DESCRIPTION OF THE RELATED ART

Exchanges, such as the Chicago Mercantile Exchange Inc. (CME), provide a marketplace where derivative products are traded. Futures and options on futures are examples of derivative products. Futures is a term used to designate all contracts covering the purchase and sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. Each futures contract is standardized and specifies commodity, quality, quantity, delivery date and settlement. Cash Settlement is a method of settling a futures contracts by cash rather than by physical delivery of the underlying asset whereby the parties settle by paying/receiving the loss/gain related to the contract in cash when the contract expires.

Some derivative contracts, such as futures contracts, may be linked to or associated with equity contracts. For example, an S&P 500 Index futures contract may be linked to an S&P 500 Index contract in the sense that the values are related. The holder of an S&P 500 Index contract may receive periodic dividend payments. However, the holder of the S&P 500 Index futures contract does not receive dividend payments. The value of the S&P 500 Index futures contract may change to reflect constructive dividend payments.

Market participants, exchanges and other entities may desire to withhold funds for constructive dividend payments. For example, to the extent tax laws require withholding of tax due on income deemed constructively received dividend, setting aside funds to satisfy the tax withholding obligation may be desirable.

SUMMARY OF THE INVENTION

Embodiments of the present invention overcome problems and limitations of the prior art by utilizing clearing house infrastructure to efficiently withhold tax payments for constructive dividend payments. The system may determine a constructive dividend payment for a derivative financial instrument. A party that receives constructive dividend payments also has a short position in a withholding financial instrument. The value of a withholding financial instrument is adjusted to have a value equal to an accumulation of constructive dividend amounts for an underlying financial instrument. A clearing house component may then determine a variation margin amount for the short party and processes a variation margin payment from the short party to a withholding account through the variation margin settlement system.

In other embodiments, embodiments of the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
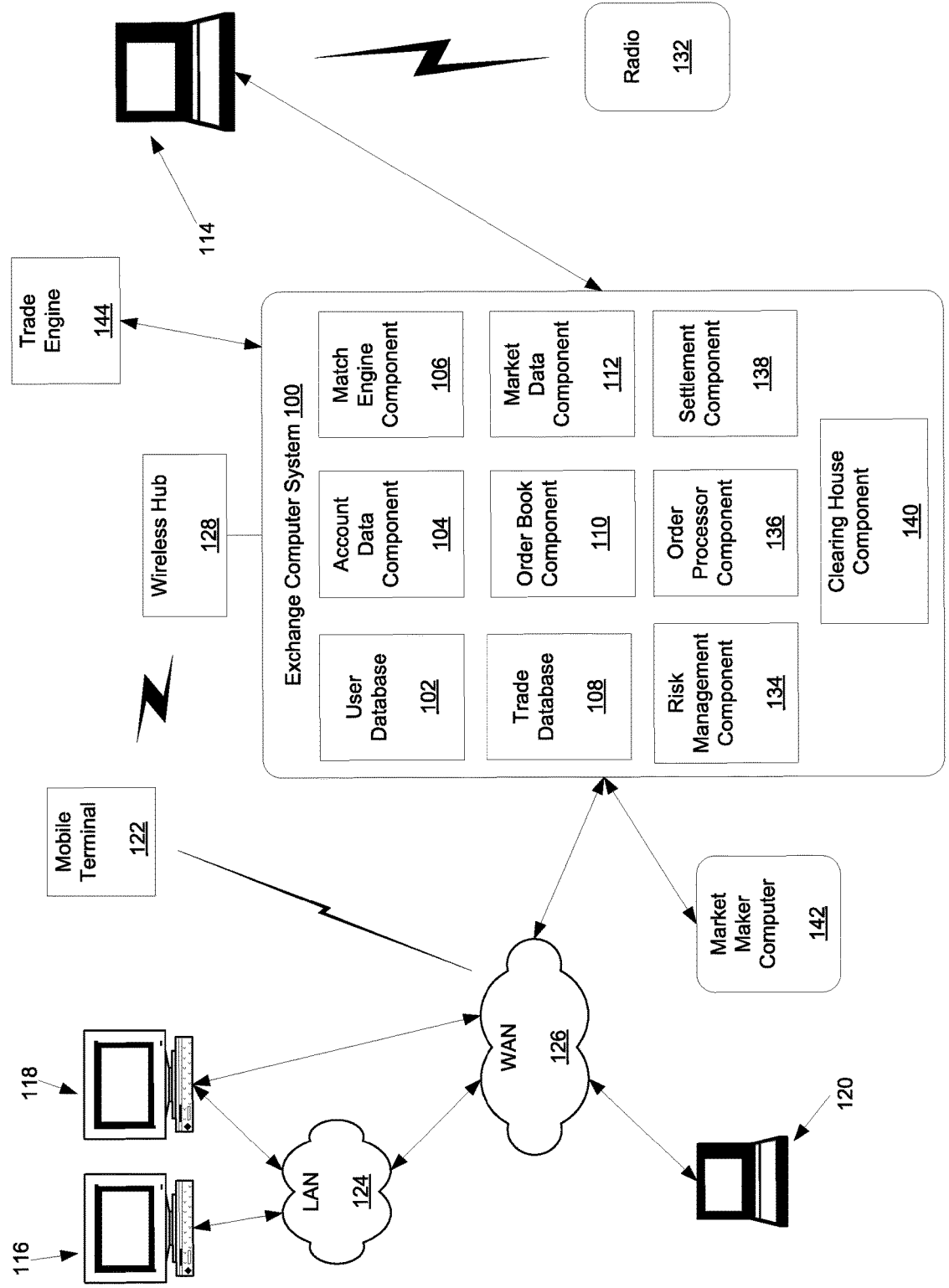
FIG. 1 shows a computer network system that may be used to implement aspects of the present invention.

Aspects of the present invention may be implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data component 104 may process account information that may be used during trades. A match engine component 106 is included to match bid and offer prices. Match engine component 106 may be implemented with hardware and software that executes one or more algorithms for matching bids and offers. Match engines may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may cause existing match engines to increase the response time or latency experienced by market participants.

A trade database 108 may be included to store information identifying trades and descriptions of trades. In particular, a trade database may store information identifying the time that a trade took place and the contract price. An order book component 110 may be included to compute or otherwise determine current bid and offer prices. A market data component 112 may be included to collect market data, e.g., data regarding current bids and offers for futures contracts, futures contract options and other derivative products. Market data component 112 may also prepare the data for transmission to users.

A risk management component 134 may be included to compute and determine a user's risk utilization in relation to the user's defined risk thresholds. An order processor component 136 may be included to decompose orders, such as orders for variable defined derivative products, and/or aggregate order types for processing by order book component 110 and match engine component 106.

A settlement component 138 may be included to provide one or more functions related to settling or otherwise administering transactions cleared by an exchange or other trading entity. Settlement component 138 of the exchange computer system 100 may be configured to use one or more settlement price determination techniques. Settlement-related functions need not be limited to actions or events occurring at the end of a contract term. For instance, in some embodiments, settlement-related functions may include or involve daily or other mark-to-market settlements for margining purposes. In some cases, settlement component 138 may be configured to communicate with the trade database 108 and/or to determine a payment amount based on a spot price, the price of the futures contract or other financial instrument, or other price data, at various times. The determination may be made at one or more points in time during the term of the financial instrument in connection with a margining mechanism. For example, the settlement component 138 may be used to determine a mark-to-market amount on a daily basis during the term of the financial instrument. Such determinations may also be made on a settlement date for the financial instrument for the purposes of final settlement.

A clearing house component 140 may be included as part of exchange computer system 100 and configured to carry out operations of a clearing house of the exchange that operates exchange computer system 100. Clearing house component 140 may receive data from and/or transmit data to trade database 108 and/or other components of exchange computer system 100 regarding trades of futures contracts, futures contracts options, and other financial products traded through the exchange that operates exchange computer system 100. Clearing house component 140 may facilitate the financial product exchange (or a clearing house of the exchange) acting as one of the parties to every traded contract or other product. For example, computer system 100 may match an offer by party A to sell a futures contract, an option or another exchange-traded financial product with a bid by party B to purchase a like exchange-traded financial product. Clearing house component 140 may then creates an exchange-traded financial product between party A and the exchange clearing house and a second exchange-traded financial product between the exchange clearing house and party B. Clearing house component 140 similarly create offsetting contracts when creating contracts as a result of an option exercise and/or may select option grantors to fulfill obligations of exercising option holders. Clearing house component 140 may also be configured to perform other clearing house operations. As a further example, clearing house component 140 may maintain margin data with regard to clearing members and/or trading customers. As part of such margin-related operations, clearing house component 140 may store and maintain data regarding the values of various options, futures contracts and other interests, determine mark-to-market and final settlement amounts, confirm receipt and/or payment of amounts due from margin accounts, confirm satisfaction of delivery and other final settlement obligations, etc.

Each of the components shown as part of exchange computer system 100 may be implemented with one or more processors configured to execute computer-executable instructions for carrying out the functions described above. Those instructions may be stored in a memory located at the component or elsewhere. For example, match engine component 106 may be implemented with one or more processors programmed with computer-executable instructions, stored in a memory located at component or elsewhere, for matching bids and offers. Some of the components shown as part of exchange computer system 100 may share one or more processors or processing cores. The components shown may also be implemented with separate processors or processing cores of computing devices or hardware components connected in a networked computer system. Databases 102 and 108 may be implemented with memory devices that store organized collections of data. In some embodiments concurrent processing limits may be defined by or imposed separately or in combination on one or more of the components or databases of exchange computer system 100.

In some embodiments, one or more of the components of exchange computer system 100 may be integrated to any desired extent. For example, the settlement component 138 and the risk management component 134 may be integrated to any desired extent. In some cases, one or more margining procedures or other aspects of the margining mechanism(s) may be implemented by settlement component 138.

The trading network environment shown in FIG. 1 includes computer devices 114, 116, 118, 120 and 122. Each computer device includes a central processor that controls the overall operation of the computer and a system bus that connects the central processor to one or more conventional components, such as a network card. Each computer device may also include a variety of interface units and drives for reading and writing data or files. Depending on the type of computer device, a user can interact with the computer with a keyboard, pointing device, microphone, pen device or other input device.

Exchange computer system 100 may also communicate in a variety of ways with devices that may be logically distinct from computer system 100. For example, computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via T1 lines or other wired or wireless communication paths. Alternatively, a mobile terminal 122, which may be implemented with a mobile phone, may communicate with LAN 124 or a wide area network (WAN) 126, such as the Internet, via radio waves. Mobile terminal 122 may also communicate with exchange computer system 100 via a conventional wireless hub 128. FIG. 1 also shows LAN 124 connected to WAN 126. LAN 124 may include a router to connect LAN 124 to WAN 126. Computer device 120 is shown connected directly to WAN 126. The connection may be via a network interface card or any other device for connecting a computer device to a network.

One or more market maker computers 142 may maintain one or more markets by providing bid and offer prices for a derivatives or securities to exchange computer system 100. Exchange computer system 100 may also exchange information with other trade engines, such as trade engine 144. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. Various computer-readable media that are tangible and non-transitory may be used. In one example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Embodiments of the invention use clearing houses to withhold tax payments for constructive dividend payments. Typically, an exchange or other trading entity provides a "clearing house" which is a division of the exchange through which all trades made must be confirmed, matched and settled each day until offset or delivered. The clearing house may be an adjunct to the exchange responsible for settling trading accounts, clearing trades, collecting and maintaining performance bond funds, regulating delivery and reporting trading data. Clearing is the procedure through which the clearing house becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the clearing house.

As an intermediary, an exchange bears a certain amount of risk in each transaction that takes place i.e., the exchange assumes counterparty credit risks in each transaction by inserting its clearing house as the counterparty to both sides of the transaction. To that end, risk management mechanisms protect the exchange via the clearing house. The clearing house establishes clearing level performance bonds (margins) for all exchange products and establishes minimum performance bond requirements for customers of exchange products. A performance bond, also referred to as a margin, is the funds that must be deposited by a customer with his or her broker, by a broker with a clearing member or by a clearing member with the clearing house, for the purpose of insuring the opposing clearing broker, its customer or clearing house against loss on open futures or options contracts. This is not a part payment on a purchase. The performance bond helps to ensure the financial integrity of brokers, clearing members and the exchange as a whole. The performance bond to clearing house refers to the minimum dollar deposit which is required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Accounts of individual members, clearing firms and non-member customers doing business through an exchange are generally carried and guaranteed to the clearing house by a clearing member. As mentioned above, in every matched transaction executed through the exchange's facilities, the clearing house is substituted as the buyer to the seller and the seller to the buyer, with a clearing member assuming the opposite side of each transaction. The clearing house may be an operating division of the exchange, and all rights, obligations and/or liabilities of the clearing house may be rights, obligations and/or liabilities of the exchange. Clearing members assume full financial and performance responsibility for all transactions executed through them and all positions they carry. The clearing house, dealing exclusively with clearing members, holds each clearing member accountable for every position it carries regardless of whether the position is being carried for the account of an individual member, for the account of a non-member customer, or for the clearing member's own account. Conversely, as the contra-side to every position, the clearing house is held accountable to the clearing members for the net settlement from all transactions on which it has been substituted as provided in clearing house rules.

Figure 2:
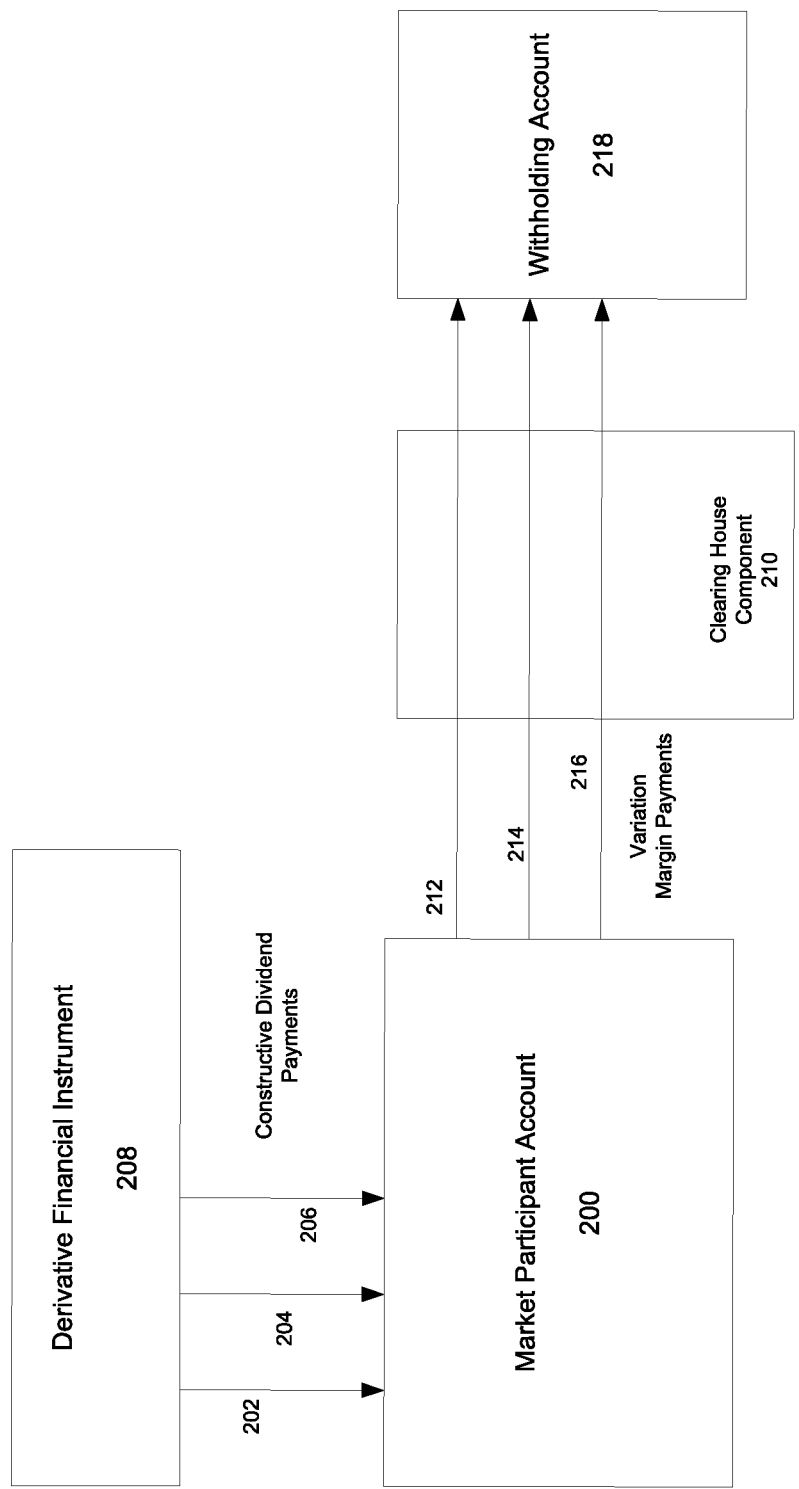
FIG. 2 shows a diagram that illustrates how an exchange or other trading entity can use an existing clearing house infrastructure to efficiently withhold payments, in accordance with an embodiment of the invention.

FIG. 2 shows a diagram that illustrates how an exchange or other trading entity can use an existing clearing house infrastructure to efficiently withhold payments, in accordance with an embodiment of the invention. An exchange computer system or other computer system (not shown) determines constructive dividend payments 202, 204 and 206 received by a market participant account 200 for a derivate financial instrument 208. Constructive dividend payments 202, 204 and 206 may be received periodically and at different times. Of course, three constructive dividend payments are shown for illustration purposes and additional payments may be received in other time periods. Constructive dividend payments 202, 204 and 206 may be the same or related to actual dividend payments from one or more underlying financial instruments. For example, derivative financial instrument 208 may be an index futures contract and constructive dividend payments 202, 204 and 206 may be the same or related to dividend payment for the underlying index contract.

As described in more detail below, a clearing house component 210 of an exchange computer system facilitates variation margin payments 212, 214 and 216 being made from market participant account 200 to a withholding account 218. Variation margin payments 212, 214 and 216 are in response to constructive dividend payments 202, 204 and 206 respectively. Variation margin payments 212, 214 and 216 may be a function of expected taxes corresponding to constructive dividend payments 202, 204 and 206, respectively.

Figure 3:
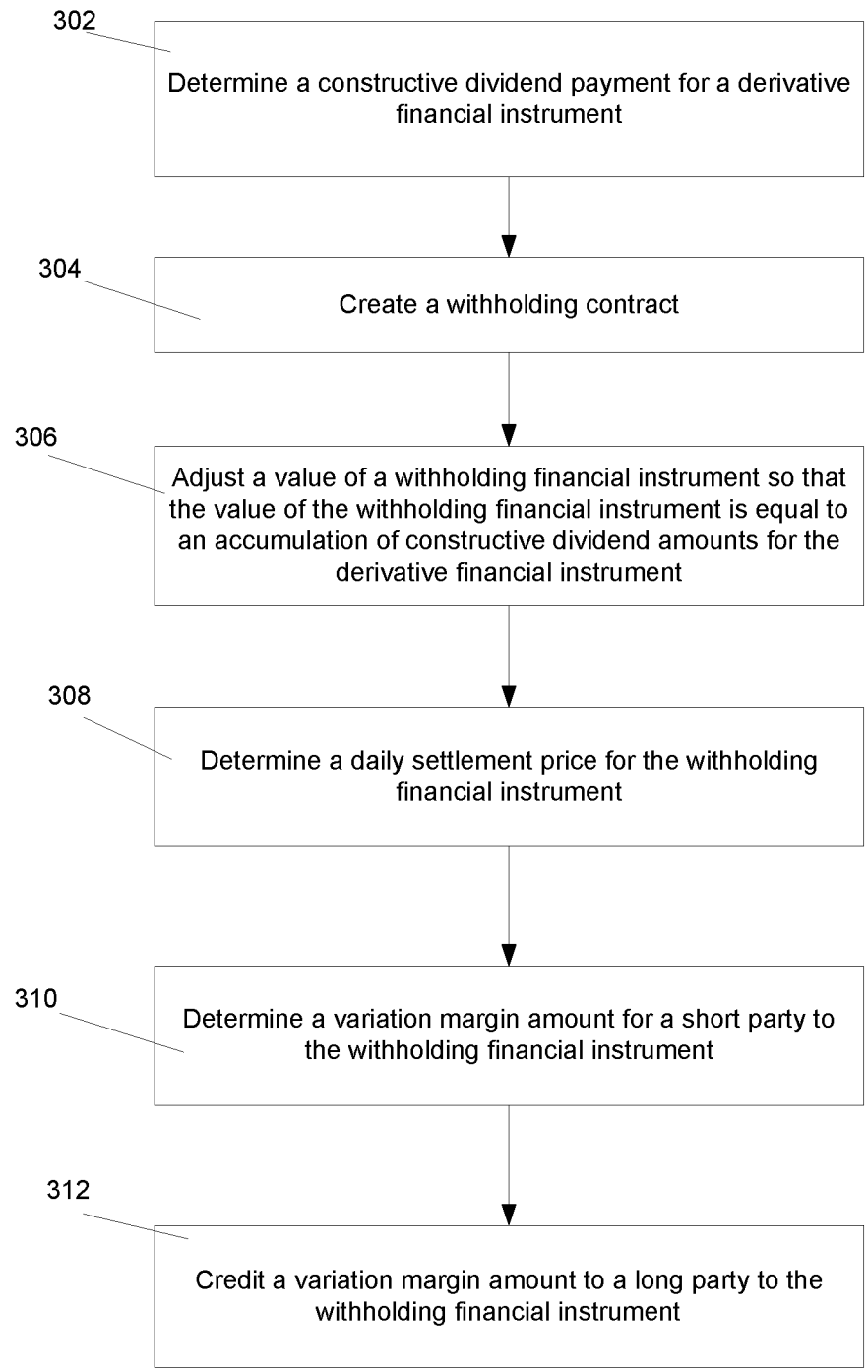
FIG. 3 shows a method that may be used to process withholding payments in accordance with an embodiment of the invention.

FIG. 3 shows a method that may be used to process withholding payments in accordance with an embodiment of the invention. First, in step 302 a constructive dividend payment for a derivative financial instrument is determined. Step 302 may be performed by a processor of an exchange computer system programmed with computer-executable instructions. Step 302 may include determining dividend payments for one or more corresponding underlying financial instruments. In some embodiments, step 302 includes analyzing data received from one or more market data feeds.

In step 304 a withholding financial instrument may be created. The withholding financial instrument corresponds to the derivative financial instrument. The withholding financial instrument may be created by an exchange computer system and created at the time of creation of the derivative financial instrument.

In response to receiving a constructive dividend payment, in step 306 a value of a withholding financial instrument may be adjusted so that the value of the withholding financial instrument is equal to an accumulation of constructive dividend amounts for the derivative financial instrument. The withholding financial instrument may expire at the same time that the derivative financial instrument expires. Step 306 may be performed by a settlement component of an exchange computer system.

In step 308, a daily settlement price of a dividend withholding contract may determined. The daily settlement process may be determined by starting with the daily settlement price from the previous day and then incrementing that value by any dividend points excised on the present day for the corresponding index futures contract. The initial settlement price of the dividend withholding contract is set to zero at the time of listing of the index futures contract. The daily dividend points increment may be sourced from a calculation agent's (electronic) output. On days in which the constituents of an index do not have any dividend payment "going ex", the daily increment will be zero. Otherwise, the increment may be the amount of the dividends converted to index points for the underlying stock index.

With the settlement price defined, the existing position ledgers and variation settlement and margining system will be able to perform the withholding function as defined.

Next, in step 310 a variation margin amount for a short party to the withholding financial instrument is determined. Step 310 may be performed by a clearinghouse component of an exchange computer system. The variation margin amount may correspond to one of variation margin payments 212, 214 or 216 and may be a function of expected tax corresponding to a constructive dividend payment. In some embodiments a contract multiplier may be used to withhold at a proper tax rate. For example, for a 30% tax rate a contract multiplier of $100 may be used for the derivative financial instrument and a contract multiplier of $30 may be used for the withholding financial instrument. In an alternative embodiment, the contract multiplier may be set at $100 but the fractional positions are permitted in the ledger. Thus, instead of shorting one contract with a $30 multiplier, the equivalent position can be shorting 0.30 contract of the $100 multiplier vehicle.

A clearinghouse component of an exchange computer system may adjust the value of the withholding financial instrument whenever constructive dividend payments are received. As such, the short party of the withholding financial instrument will pay a variation margin to the long party in a predictable manner as it is cleared by the clearing house component. Further, this variation margin payment/receipt can be comingled with the payment or receipt of variation margin due to positions/trading of other futures positions cleared through the same clearing house component.

The withholding financial instrument may be utilized to pass through withholding payments on a periodic basis through the variation margin system. The variation margin payment will then be passed from the short party to the long party through the variation margin settlement system. The long party the long party may be an account that holds assets for paying the withholding tax.

In step 312, a variation margin amount is credited to a long party to the withholding financial instrument. Step 312 may be performed by a clearinghouse component of an exchange computer system.

A system that uses a clearing house component to process withholding payments is more efficient than existing systems and combinations of systems. For example, embodiments of the invention described above utilize existing clearing house infrastructure and do not require additional computer systems to determine withholding and manage withholding accounts. Embodiments of the invention described above also limit the transfer of data between the system to accomplish the withholding function. In other words, utilizing existing clearing house infrastructure limits the amount of hardware required and the consumption of bandwidth required by sending data between various computers.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A computer system comprising:
a processor programmed with computer-executable instructions, the computer-executable instructions stored in a non-transitory memory, for identifying a derivative financial instrument and generating a withholding financial instrument having a short party thereto which is also a long party to the derivative financial instrument and wherein a long party to the withholding financial instrument is an account for holding a variation margin amount, the withholding financial instrument based on the derivative financial instrument, for transacting via a centralized transaction processing system and for determining a constructive dividend payment for the derivative financial instrument by analyzing data received via a network from one or more market data feeds, the computer-executable instructions executed by the processor and configured to implement:
a settlement component including computer-executable instructions for, in response to receiving the constructive dividend payment for the derivative financial instrument, causing the settlement component to adjust a value of the withholding financial instrument so that the value of the withholding financial instrument is equal to an accumulation of constructive dividend amounts for the derivative financial instrument; and a clearing house component including computer-executable instructions for, responsive to the adjustment of the value of the withholding financial instrument, automatically causing the clearing house component to:
determine the variation margin amount for the short party to the withholding financial instrument in response to the constructive dividend payments; and
credit, responsive to the determination of the variation margin amount, the determined variation margin amount to the long party to the withholding financial instrument, the long and short parties not being identified to each other by the clearing house component;
and
wherein the automatic credit of the variation margin to the long party to the withholding financial instrument via the centralized transaction processing system limits the consumption of bandwidth required for the short party to directly pay the accumulation of the constructive dividend amounts to the long party.

2. The system of claim 1, wherein the derivative financial instrument comprises an index futures financial instrument.

3. The system of claim 1, wherein the derivative financial instrument comprises a swap financial instrument.

4. The system of claim 1, wherein the processor programmed with computer-executable instructions for determining the constructive dividend payment for the derivative financial instrument is programmed to apply government rules for determining the constructive dividend payment.

5. The system of claim 1, wherein the constructive dividend payment is determined as a function of a dividend payment of at least one underlying financial instrument.

6. The system of claim 1, wherein the variation margin amount is a percentage of the constructive dividend amount for one trading period.

7. The system of claim 1, wherein the computer-executable instructions are further configured to implement a match engine component configured to match bids and offers.

8. The system of claim 1, wherein the computer-executable instructions are further configured to implement a market data component configured to collect and transmit market data.

9. The system of claim 1, further including a market maker computer configured to maintain at least one market by providing bid and offer prices for at least one financial instrument.

10. A method of processing payments at a central counterparty based exchange computer system, the method comprising:
identifying, by a processor coupled with the central counterparty based exchange computer system, a derivative financial instrument;
generating, by the processor, a withholding financial instrument based on the derivative financial instrument, the withholding financial instrument having a short party thereto which is also a long party to the derivative financial instrument and wherein a long party to the withholding financial instrument is an account for holding a variation margin amount;
performing on a periodic basis:
determining, by the processor, a constructive dividend payment for the derivative financial instrument by analyzing data received via a network from one or more market data feeds;
in response to receiving the constructive dividend payment for the derivative financial instrument, adjusting, by the processor, a value of the withholding financial instrument so that the value of the withholding financial instrument is equal to an accumulation of constructive dividend amounts for the derivative financial instrument;
determining, automatically by the processor responsive to the adjustment of the value of the withholding financial instrument, the variation margin amount for the short party to the withholding financial instrument in response to the constructive dividend payments; and
crediting, by the processor responsive to the automatic determination of the variation margin amount, the determined variation margin amount to the long party to the withholding financial instrument, the long and short parties not being identified to each other by the processor;
and
wherein the automatic crediting of the variation margin to the long party to the withholding financial instrument via the central counterparty based exchange computer system limits the consumption of bandwidth required for the short party to directly pay the accumulation of the constructive dividend amounts to the long party.

11. The method of claim 10, wherein the derivative financial instrument comprises an index futures financial instrument.

12. The method of claim 10, wherein determining the constructive dividend payment comprises applying government rules for determining the constructive dividend payment.

13. The method of claim 10, wherein the constructive dividend payment is determined as a function of a dividend payment of at least one underlying financial instrument.

14. The method of claim 10, wherein the variation margin amount is a percentage of the constructive dividend amount for one trading period.

15. A tangible computer-readable medium containing computer-executable instructions that when executed by a processor coupled therewith, cause a central counterparty based exchange computer system to perform the steps comprising:
generating a withholding financial instrument based on a derivative financial instrument, the withholding financial instrument having a short party thereto which is also a long party to the derivative financial instrument and wherein a long party to the withholding financial instrument is an account for holding a variation margin amount;
performing on a periodic basis:
determining a constructive dividend payment for the derivative financial instrument by analyzing data received via a network from one or more market data feeds;
in response to receiving the constructive dividend payment for the derivative financial instrument, adjusting a value of the withholding financial instrument so that the value of the withholding financial instrument is equal to an accumulation of constructive dividend amounts for the derivative financial instrument;
determining, automatically responsive to the adjustment of the value of the withholding financial instrument, the variation margin amount for the short party to the withholding financial instrument in response to the constructive dividend payments; and crediting, response to the automatic determination of the variation amount, the determined variation margin amount to the long party to the withholding financial instrument, the long and short parties not being identified to each other by the central counterparty based exchange computer system;

and wherein the automatic crediting of the variation margin to the long party to the withholding financial instrument via the central counterparty based exchange computer system limits the consumption of bandwidth required for the short party to directly pay the accumulation of the constructive dividend amounts to the long party.

16. The tangible computer-readable medium of claim 15, wherein the derivative financial instrument comprises an index futures financial instrument.

17. The tangible computer-readable medium of claim 15, wherein the constructive dividend payment is determined as a function of a dividend payment of at least one underlying financial instrument.

18. The tangible computer-readable medium of claim 15, wherein the variation margin amount is a percentage of the constructive dividend amount for one trading period.

19. The tangible computer-readable medium of claim 15, wherein the derivative financial instrument comprises a swap financial instrument.

* * * * *